United States Patent Office 3,486,731
Patented Dec. 30, 1969

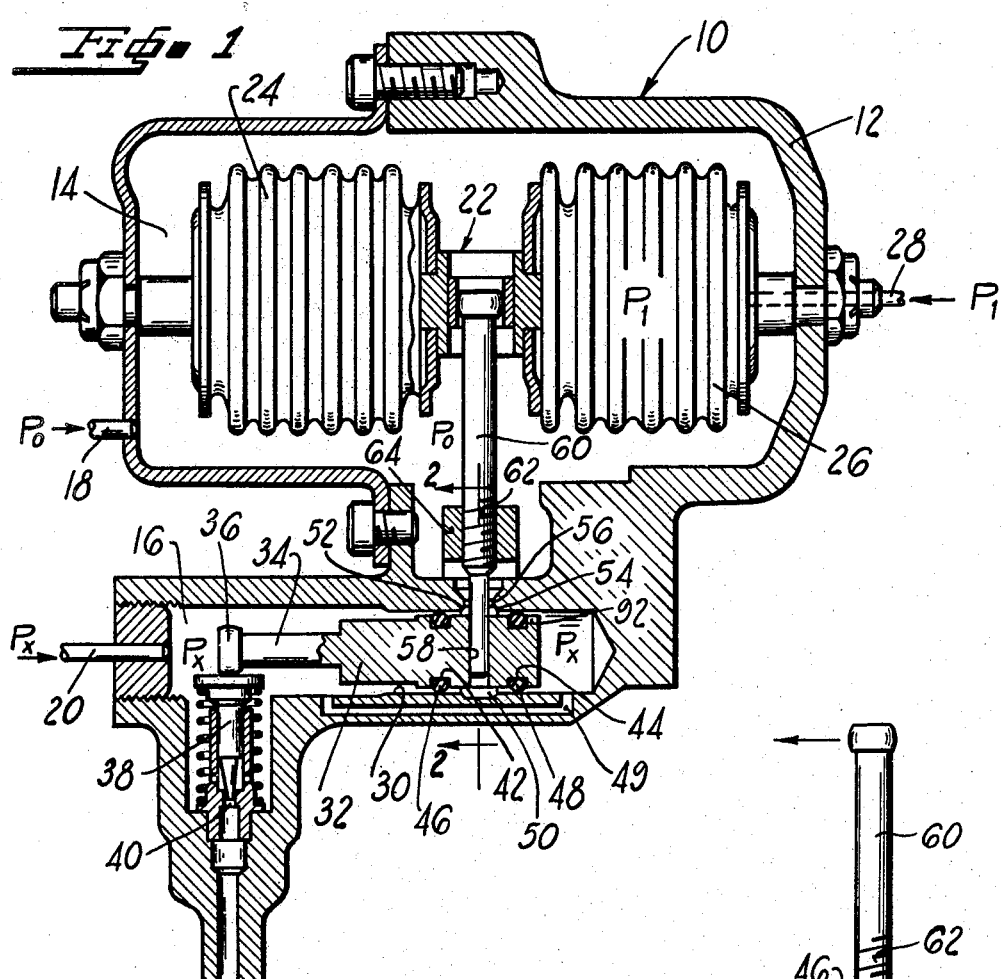
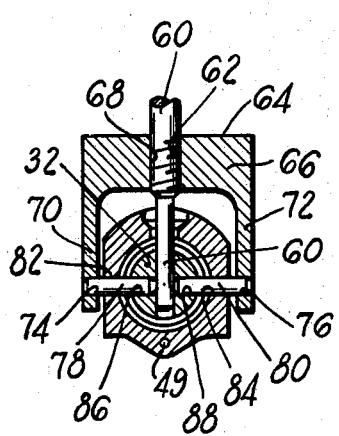

3,486,731
CONTROL APPARATUS WITH PIVOTAL LEVER FOR TRANSMITTING MOTION
Seeley L. Magnani, Cincinnati, Ohio, and Michael P. Fodroci and George H. Flake, South Bend, Ind., assignors to The Bendix Corporation, a corporation of Delaware
Filed May 17, 1968, Ser. No. 730,032
Int. Cl. F16k *31/12, 31/165*
U.S. Cl. 251—58                              8 Claims

ABSTRACT OF THE DISCLOSURE

A control apparatus having a low pivotal friction lever means for transmitting motion from a low to a high fluid pressure environment.

BACKGROUND OF THE INVENTION

The invention concerns an improvement to control mechanisms of the type generally used in fuel metering and control systems for communicating control information from one pressure environment to another. However, it is felt that the invention may be used for any application where motion transmission between two fluid pressures is required.

The conventional control devices for use with fuel metering and control systems with which I am familiar are comprised primarily of lever means appropriately sealed about the pivot point to separate two fluid pressures or sealed such that the pivot point is immersed in high pressure fluid. These techniques introduce an undesirable high pivotal friction on the lever which tends to reduce lever sensitivity to low level inputs as well as degrade system response time.

SUMMARY OF THE INVENTION

It is the purpose of this invention to provide a fluid pressure control device whose sensitivity is improved in response to the specification demands imposed by current fuel metering and control requirements, and further, within the prevailing size, weight and cost restraints. This device provides heretofore unattainable sensitivity by minimizing pivotal friction normally associated with the lever means used to communicate movement from one fluid environment to another higher pressure fluid environment.

Other objects and features of the invention will be apparent from the following description of the fluid pressure control device taken in connection with the accompanying drawings.

BRIEF DESCRIPTION OF THE DRAWINGS

FIGURE 1 is a sectional schematic of the components comprising the control device;

FIGURE 2 is a sectional view taken along line 2—2 of FIGURE 1; and

FIGURE 3 is an enlarged sectional view of the lever means of FIGURE 1 depicting lever movement in response to a variable input.

DESCRIPTION OF THE PREFERRED EMBODIMENT

Referring now to the drawings and particularly to FIGURE 1, the fluid pressure control device 10 is of the variety used in association with a fuel metering and control system.

A housing 12 has therein two fluid chambers 14 and 16. Fluid chamber 14 receives a reference pressure fluid $P_o$ through fluid inlet 18. Fluid chamber 16 receives a servo pressure fluid $P_x$ through fluid inlet 20. Said servo pressure fluid $P_x$ is of a higher pressure level than said reference pressure fluid $P_o$.

The fluid chamber 14 has disposed therein an input responsive means 22 comprised of an evacuated bellows 24 rigidly mounted on one end to said housing 12 and on the other end to a bellows 26 which itself is rigidly mounted to said housing 12. Bellows 24 and 26 are arranged in a force-opposing relationship. Bellows 26 is responsive to and receives a variable input pressure $P_1$ through fluid inlet 28.

The fluid chamber 16 has therein a bore 30 which pivotally receives a plug 32. The plug 32 has rigidly attached thereto a stem 34 and an actuating means 36 for a point contact engagement with, and control of, valve 38 which in cooperation with orifice 40 establishes the fluid pressure in fluid chamber 16. The plug 32 has annular grooves 42 and 44 inward from each end for receiving O-ring seals 46 and 48, respectively. Said seals engage the plug 32 and bore 30 to establish a fluid seal therebetween. It is noted that the high pressure fluid $P_x$ of chamber 16 communicates to both ends of plug 32 by passage 49.

The bore 30 has an annular groove 50 with chamfered ends 52 and 54 to minimize, if not eliminate, possible cutting damage to the seal 48 during assembly of the plug 32 into the bore 30. The annular groove 50 communicates through an opening 56 with fluid chamber 14.

Plug 32 has a diametrical hole 58 for receiving one end of a shaft 60. The shaft 60 projects through opening 56 which has sufficient clearance to allow said shaft to move freely laterally. The other end of shaft 60 operatively engages said input responsive means 22 intermediate said bellows 24 and 26 and thus, is responsive to a variable input. The shaft 60 further has a threaded portion 62 intermediate its ends for engagement with a connecting means 64. Said connecting means 64 is comprised of a yoke 66 having a threaded bore 68 to receive said threaded portion 62 of shaft 60 and arms 70 and 72 with said arms including pin receptacles, 74 and 76, respectively. The connecting means 64 further includes diametrically opposed pins 78 and 80 pivotally retained in arm receptacles 74 and 76, respectively. Pins 78 and 80 extend through openings 82 and 84 in the wall of fluid chamber 16 into cylindrical bores 86 and 88, respectively, in said plug 32 and abut shaft 60. The connecting means 64 in combination with the shaft 60, the plug 32 and the wall of fluid chamber 16 confines the plug 32 to pivotal movement about the pins 78 and 80. Thus, the above combination functions as a lever to translate motion from said input responsive means 22 to said valve 38.

It is desirable that the seals 46 and 48 and their respective grooves 42 and 44 be located as close as possible to the groove 50 to minimize the torque required on the shaft 60 to move the seals 46 and 48 in response to a variable input. Further, it is desirable to have annular edges 91 and 92 of the plug 32 located equal distance from a longitudinal axis taken through the center lines of said pins 78 and 80, to preclude one end of the plug 32 from engaging said bore 30 wall before the other end, upon deflection of the shaft 60, in either direction, in response to an input variation.

MODE OF OPERATION OF THE PREFERRED EMBODIMENT

In the presence of an input pressure $P_1$, the fluid pressure control device 10 is aligned such that the axis of the plug 32 is coextensive with the axis of the bore 30 and the valve 38 is positioned, with respect to the orifice 40, intermediate its open and closed positions. The evacuated bellows 24 will exhibit an absolute reference pressure opposing the variable input pressure $P_1$. Upon an increase in input pressure $P_1$ the bellows 26 will impart a pressure to the shaft 60 causing said shaft 60 to move to the left as can best be seen in FIGURE 3. Said shaft 60 in combination with said connection means 64, said plug 32 and wall of fluid chamber 16 form a lever pivoting within the bore 30 along a diametrical line taken through the center lines of said pins 78 and 80 in response to the above input variation. Thus, the pivotal movement of plug 32 causes its stem 34 and actuating means 36 to be deflected downward, as shown in FIGURE 3, to further close valve 38 with respect to orifice 40.

Thus, said servo pressure $P_x$ is a controlled pressure upon which said fluid pressure control device 10 superimposes an additional control as a function of said variable input pressure $P_1$.

It is understood that a decrease in input pressure $P_1$ will result in an identical converse action with the result that valve 38 will be further opened with respect to orifice 40.

We claim:
1. A control apparatus comprising:
   a housing having first and second fluid chambers, one of which contains fluid at a higher pressure relative to the other,
   said first fluid chamber having disposed therein a means responsive to a variable input,
   said second fluid chamber having a means responsive to an output,
   said second fluid chamber having therein a bore for pivotally receiving a plug with annular grooves inward from each end having annular seals therein operatively connected to said plug and engaging said bore to create fluid seals therebetween,
   said plug having opposite ends exposed to the pressurized fluid in said second chamber to thereby establishing a pressure balance thereon,
   said bore having an annular groove intermediate said seals which communicates through an opening with said first fluid chamber,
   said plug having attached thereto a shaft whose other end projects through said opening into said first fluid chamber and operatively engages said variable input responsive means,
   said shaft having attached thereto a connecting means pivotally engaging said housing and said plug,
   said shaft and said plug together forming an actuating lever which in response to a variable input pivots about a diametrical axis perpendicular to the axis of said plug whereby said plug communicates movement to said output responsive means.

2. A control apparatus as recited in claim 1, wherein said bore has a predetermined diameter relative to the diameter of said plug.

3. A control apparatus as recited in claim 1, wherein said plug comprises:
   a cylindrical section having annular sealing members thereon of a predetermined relationship with respect to each end,
   a first diametrically located hole through said cylindrical section intermediate said annular sealing members for receiving said shaft,
   a second diametrically located hole through said cylindrical section perpendicular to and in the same plane as said first hole for receiving from each side a pivot pin retained by said yoke means and the wall of said bore,
   said cylindrical section having attached to one end a stem with an actuating means to engage said output responsive means.

4. A plug as recited in claim 3, wherein said actuating means has an annular arced surface to provide a point contact engagement with said output responsive means.

5. A plug as recited in claim 3, wherein said annular sealing members are spaced equal distance from said ends of said cylindrical section and said first diametrically located hole.

6. A control apparatus as recited in claim 1, wherein said annular groove intermediate said seals has an annular chamfer on both ends to facilitate assembly of said plug and said seals into said bore without damage to said seals.

7. A control apparatus as recited in claim 1, wherein:
   said shaft includes an annular arced surface on one end to provide a point contact engagement with said input responsive means,
   the other end of said shaft being cylindrical with a conical tip,
   said connecting means including yoke means,
   said shaft having intermediate said ends a threaded section of a larger diameter than said other end for engagement with said yoke means.

8. A control apparatus as recited in claim 1, wherein said connecting means comprises:
   a yoke having two arms each with a receptacle,
   two diametrically opposed pins pivotally retained by said arm receptacles and extending through said second fluid chamber wall into cylindrical bores in said plug to preclude other than pivotal movement of said plug relative to said bore,
   a threaded bore in said yoke means intermediate said arms and adapted to receive a threaded shaft of which one end is received by said plug and the other end being responsive to said variable input responsive means.

References Cited

UNITED STATES PATENTS

| 2,770,441 | 11/1956 | Grove | 251—58 |
| 3,421,732 | 1/1969 | Golden | 251—58 |

FOREIGN PATENTS

| 297,129 | 1932 | Italy. |

ARNOLD ROSENTHAL, Primary Examiner

U.S. Cl. X.R.

251—61